Dec. 22, 1964  T. HOPWOOD  3,162,401
AIRCRAFT AND LIFT DEVICES THEREFOR
Filed Dec. 8, 1961  3 Sheets-Sheet 1
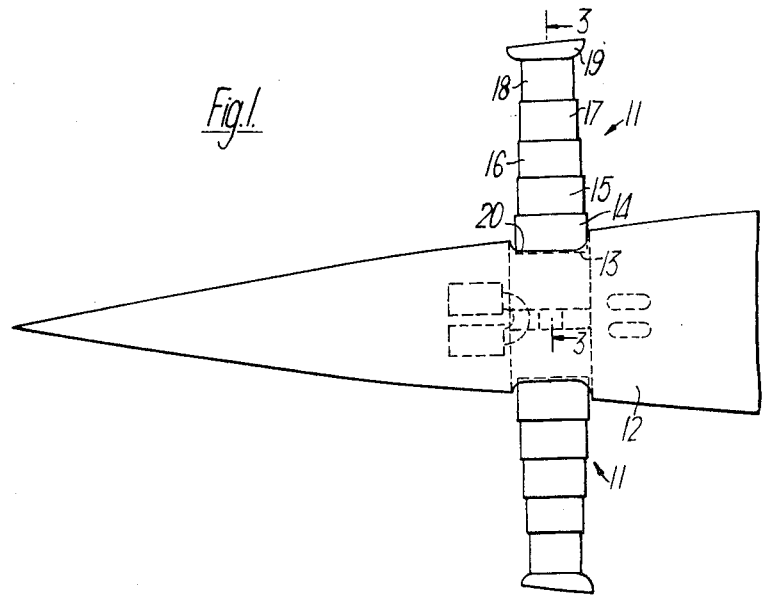
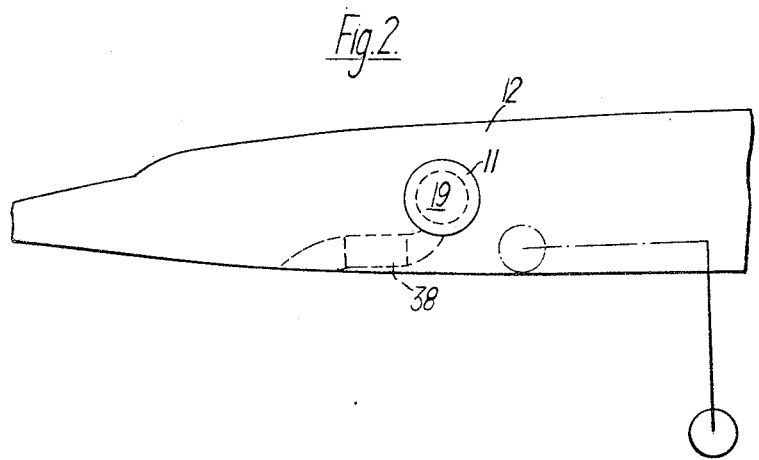
Inventor
Thomas Hopwood
By Dowell & Dowell
Attorneys

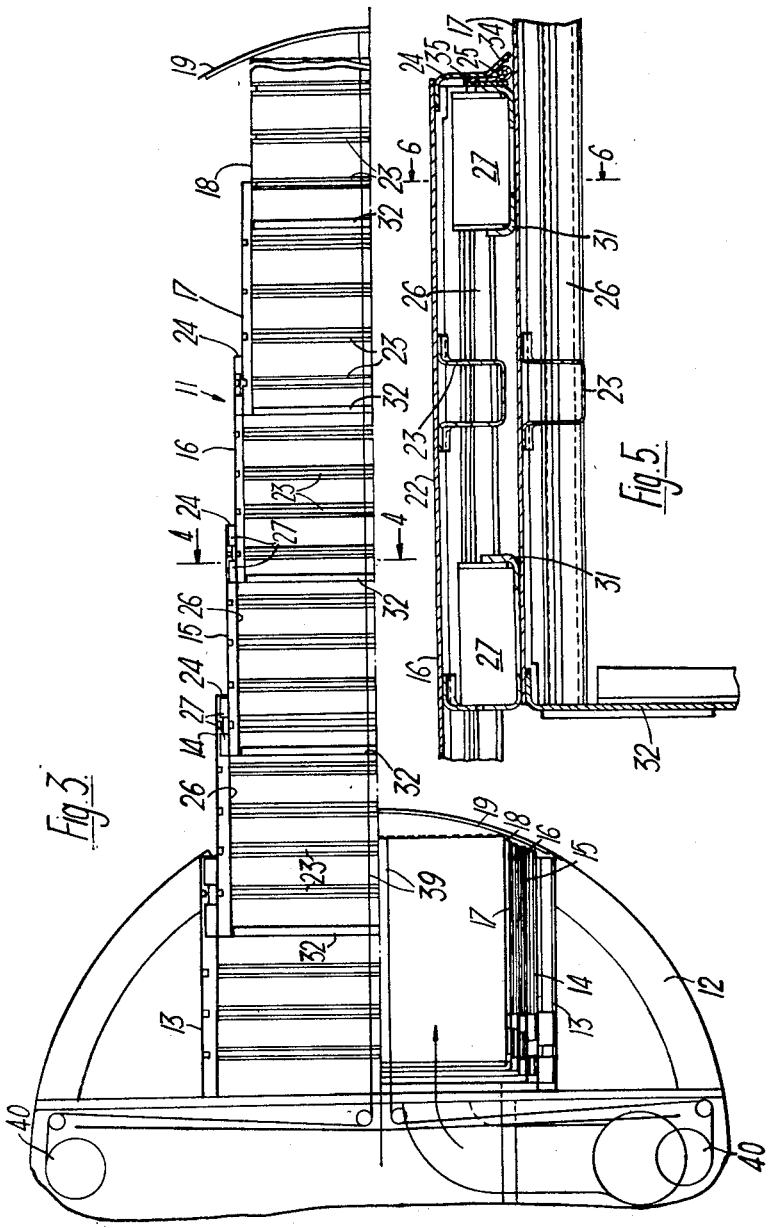

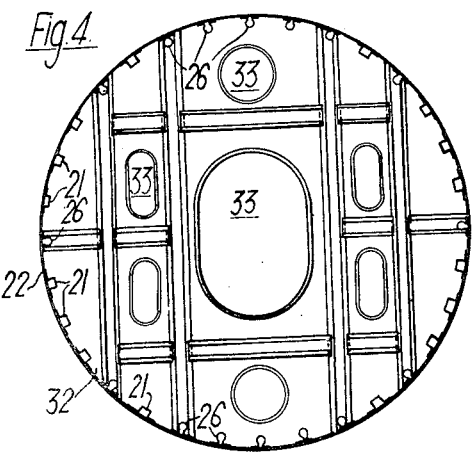
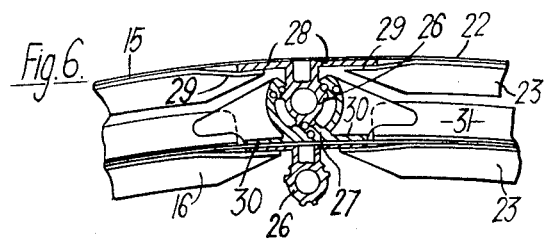
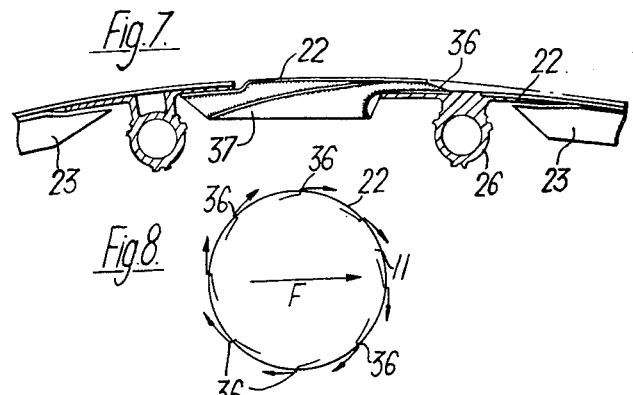

United States Patent Office 3,162,401
Patented Dec. 22, 1964

3,162,401
AIRCRAFT AND LIFT DEVICES THEREFOR
Thomas Hopwood, Esher, England, assignor to Hawker Siddeley Aviation Limited, Surrey, England
Filed Dec. 8, 1961, Ser. No. 158,009
Claims priority, application Great Britain, Dec. 12, 1960, 42,767/60
11 Claims. (Cl. 244—42)

This invention is concerned with devices for providing lift in aircraft.

Whereas the conventional lift-producing device in aircraft is an aerofoil surface, the amount of the lift afforded by such a surface varies according to the angle of incidence and there are instances when it is desirable to be able to provide lift that does not vary. It may, for example, be necessary to provide an auxiliary lift surface to trim an aeroplane but the conventional means, if employed, would have a destabilising effect.

One particular case occurs in high-speed aeroplanes where the main lifting surface, or the centre of lift of the main surface, is aft of the centre of gravity and additional lift at a forward situation is needed from time to time, as when landing and at take-off, for trim purposes. A forward auxiliary surface of the conventional kind would produce an increasing nose-up moment with increasing incidence and vice-versa, which is undesirable from the point of view of stability.

According to the present invention there is employed a lift augmenting device including a substantially cylindrical structure which is extendable to a configuration in which it projects laterally from the aircraft body with its axis across the direction of flight, with means for producing a forced circulation of air around said cylindrical structure when so extended, and wherein said cylindrical structure comprises a number of hollow cylindrical sections of progressively decreasing diameter arranged to slide telescopically one inside another to permit retraction of the device into the body of the aircraft when its lift contribution is not required said cylindrical structure being supported from the body of the aircraft at the larger diameter end only when extended.

It has been known that lift could be obtained by circulating air around a cylindrical body itself moving in air in a direction transverse to its longitudinal axis. Hitherto, such considerations have been of academic interest only because a cylindrical body of a size to afford useful lift exacts too great a drag penalty at normal flying speed, especially in the case of a high speed aircraft. However, with the arrangement according to the invention the cylindrical lift device can be extended and employed for trim purposes when needed at low flying speeds, and can be retracted at normal flying speeds when it is not required.

In the case of an aircraft with the main lifting surface, or centre of lift, aft of the centre of gravity, a pair of the retractable cylindrical lift devices can be disposed one at each side of the forebody of the fuselage. When those are in use they will have the effect of bringing forward the centre of lift of the whole aircraft without the unstable characteristics that would arise if the trim control were by means of conventional aerofoil surfaces.

With a hollow telescopic cylindrical structure the air to be circulated around it can be supplied under pressure to its interior and delivered tangentially through longitudinal orifices in its cylindrical walls. The pressure of this air supply to the interior of the structure can also be used to extend it.

One construction in accordance with the invention will now be described by way of example and with reference to the accompanying diagrammatic drawings in which—

FIGURE 1 is a plan of the forepart of an aircraft provided with lift devices according to the invention, FIGURE 2 is a side elevation of the aircraft forepart of FIGURE 1, FIGURE 3 illustrates one of the lift devices in more detail and as seen on the line 3—3 of FIGURE 1, the part of the figure above the centre line showing the device extended and that below the centre line showing it retracted, FIGURE 4 is a cross-section of one of the telescoping sections of a lift device taken on the line 4—4 of FIGURE 3, FIGURE 5 is a detail sectional view from the same viewpoint as FIGURE 3 but showing only parts of two telescoping sections to illustrate how they are arranged to slide one within another, FIGURE 6 is a section on the line 6—6 of FIGURE 5, FIGURE 7 is a detail cross-sectional view of part of the skin structure of one of the sections, and FIGURE 8 is a diagram illustrating how air is blown out around each lift device.

In the drawings, FIGURES 1 and 2 show a pair of retractable lift devices 11 disposed one on either side of the nose of a large high speed aircraft 12 having its main lifting surface aft.

Each lift device 11 comprises a series, six in the example illustrated, of substantially cylindrical sections 13 to 18 each of smaller diameter than, and sliding telescopically in, the one before it. The largest 13 is a fixed section buried in the aircraft fuselage, with the remainder projecting laterally out therefrom when the structure is extended and nesting within the buried section when telescoped. The smallest diameter section 18, that is to say the one that is outermost when the structure is extended, carries at its outboard end a fuselage panel 19 that closes the fuselage aperture 20 through which the structure projects and thereby completes the fuselage skin when the structure is retracted.

Referring now to FIGURES 3 and 4, each cylindrical section is built up of two end frames between which extend longitudinal stringers 21 of top hat cross-section to carry the circumferential wall or skin 22 of the section. There are also top hat cross-section circumferential stiffeners 23 at places between the end frames. The outboard end frame 24 of each section, except the smallest, has a large circular aperture in which the next section out slides, and an O-ring seal 25 (FIGURE 5) lodged in the end frame bears on the outer surface of the circumferential wall of that next section.

To facilitate sliding of one section within another recirculating ball splines are used (FIGURES 5 and 6). The top hat stringers 21 are spaced at equal intervals around the internal face of the circumferential wall of each section, except that perhaps half or more of the stringer positions are occupied instead by guide rails or splines 26 along which slide recirculating ball sleeves 27 secured at the outside of the inboard end portion of the next section out. The complete assemblies of splines and sleeves aid the top hat section members in that they act as further stringers to take bending and end loads when the cylinder structure is subjected to pressure and lift.

The guide rails or splines 26 of each section extend the full length thereof, and where a spline cuts through a circumferential stiffener 23 the gap in the stiffener is bridged by securing flanges 28 for the spline. These flanges are contiguous with the inner surface of the circumferential skin 22 of the section and have portions of their margins inserted between the skin plating and cranked ends 29 of the cut stiffener, the stiffener, flange and skin plating being riveted through on each side of the spline.

The recirculating ball sleeves 27 are similarly secured by flanges 30 to the external surface of the inboard end portion of the section and they are united with circumferentially-extending tie members 31 around the section exterior. In the case of the intermediate sections 14 to 17 of the cylindrical structure there are, of course, both internal splines and external ball sleeves, and they can be secured to opposite surfaces of the skin plating by the same rivets. The limits of sliding of one section telescopically in the next larger section inboard of it are determined by abutment of the ball sleeve and tie structure against the end frames of the larger section.

Although the inboard end frames 32 (FIGURE 4) of the sections are built-up frame structures effectively occupying the complete cross-section of their respective sections, they have lightening holes 33, and so the interior of the sections are all in communication with one another. Consequently, if the cylinder structure is in the telescoped or retracted condition supply of air under pressure to the interior of the section 13 of largest diameter at the extreme inboard end causes the structure to extend. The panel 19 blanking off the outboard end of the smallest diameter section 18 is constructed as a bulkhead to withstand the internal pressure. Each ring seal 25 at the outboard end of a section is associated with a cone face 34 of the end frame 24 that carries it, and is arranged for wedging into firm sealing engagement with the outer circumferential surface of the next section out when engaged and squeezed by the outboard end face of a tie member 31 of the external ball sleeve and tie structure of that next section. To facilitate this and securing of the ring seal 25 to its respective end frame it is provided with an outwardly-extending radial flange 35.

When the telescopic structure is extended, the air under pressure therein is delivered through longitudinal slots 36 in the circumferential walls of the sections (FIGURES 7 and 8). In the example illustrated there are eight slots spaced evenly around the circumference of a section, each slot having its opening arranged to deliver the air tangentially. In order to maintain wall strength each slot 36 is constituted as an opening through a separate integral throat sub-assembly 37 that is capable, when built into the necessary gap provided in the circumferential wall of a section, of transferring hoop tension across the gap.

The slots are of course provided only along that portion of each structure that lies external to the fuselage when the structure is extended. FIGURE 8 illustrates the arrangement of the eight slots, the direction of flight being indicated by the arrow F.

The air supply is furnished by power plant 38 mounted in the fuselage of the aircraft (FIGURE 2), lift engines of the type employed to provide downward thrust in vertical take-off machines being well suited to this duty.

When the telescopic structure is to be retracted it can be winched in by cables 39 wound on electric motor-driven drums 40 (FIGURE 3). The cylinders will be locked in position when fully retracted.

The weight penalty of the arrangement described is significant but owing to the resulting ability of the aircraft to fly at low speeds with reduced angle of incidence a considerable reduction in the weight of the undercarriage is possible, giving an appreciable overall weight saving.

An interesting aspect of the arrangement is that advantage is taken of the fact that the internal air pressure in the cylinder structure cancels, at least in part, compressive loads. If there were no internal pressure, part of the outside walls and the associated stringers would have to be suitably strengthened to take the loads usual in a beam subjected to bending. Furthermore, locking arrangements would be required between individual sections to prevent partial telescoping at the upper side.

I claim:

1. In an aircraft having a fuselage, a lift-augmenting device including a substantially cylindrical structure which is extendable to a configuration in which it projects laterally from the aircraft fuselage with its axis across the direction of flight, said cylindrical structure comprising a first hollow cylindrical section fixedly mounted wholly within the aircraft fuselage in alignment with a fuselage side wall aperture, a plurality of further cylindrical sections of progressively decreasing diameter the largest of which is mounted to slide telescopically within said first cylindrical section while each of the remaining cylindrical sections is mounted to slide telescopically within the section next larger in diameter, said plurality of further cylindrical sections being extendable at will out through said aperture to project laterally from the fuselage and being retractable at will to bring all said cylindrical sections into a nested condition entirely within the fuselage, the cylindrical structure being supported from the fuselage at the larger diameter end only when extended, each of said cylindrical sections except said first section having a plurality of slots spaced around its circumference through which air is delivered out of the cylindrical section substantially tangentially, and means for supplying air under pressure to said slots.

2. A lift-augmenting device according to claim 1, wherein the smallest diameter cylindrical section carries a panel arranged to close said fuselage side wall aperture when the sections are retracted into the fuselage.

3. In an aircraft having a fuselage, a lift-augmenting device including a substantially cylindrical structure which is extendable to a configuration in which it projects laterally from the aircraft fuselage with its axis across the direction of flight, said cylindrical structure comprising mounting means fixed to the aircraft fuselage, a plurality of cylindrical sections of progressively decreasing diameter the largest of which is mounted on said mounting means to slide laterally with respect to the fuselage while each of the remaining cylindrical sections is mounted to slide telescopically within the section next larger in diameter, said plurality of cylindrical sections being extendable at will to project laterally from the fuselage and being retractable at will into the telescoped condition, the cylindrical structure being supported from the fuselage at the larger diameter end only when extended, each of said cylindrical sections having a plurality of nozzles spaced equidistantly around its circumference and defining slot openings to deliver air out of the cylindrical section substantially tangentially, means for supplying air under pressure to the interior of said largest section and thereby to the interiors of said remaining sections to both extend the cylindrical structure and counteract bending loads thereon and to provide a supply of air for discharge through the nozzles, power means to retract the sections of the cyilndrical structure into the telescoped condition, sliding seals on said cylindrical sections to effect sealing between the cooperating ends of adjacent sections when the cylindrical structure is extended, and a closure panel carried by the outer end of the smallest diameter cylindrical section which serves to seal the outer end of the smallest diameter section against escape of air when the cylindrical structure is extended.

4. In an aircraft having a fuselage, a lift-augmenting device including a substantially cylindrical structure which is extendable to a configuration in which it projects laterally from the aircraft fuselage with its axis across the direction of flight, said cylindrical structure comprising mounting means mounted wholly within the aircraft fuselage in alignment with a fuselage side wall aperture, a plurality of cylindrical sections of progressively decreasing diameter the largest of which is mounted on said mounting means to slide laterally with respect to the fuselage while each of the remaining cylindrical sections is mounted to slide telescopically within the section next larger in diameter, said plurality of cylindrical sections being extendable at will out through said aperture to project laterally from the fuselage and being retractable at will to bring all said cylindrical sections into a nested condition entirely within the fuselage, the cylindrical structure being supported from the fuselage at the larger diameter and only when extended, each of said cylindrical sections except said first section having a plurality of slots spaced around its circumference through which air is delivered out of the cylindrical section substantially tangentially, and means for supplying air under pressure to said slots.

5. A lift-augmenting device according to claim 4, wherein the smallest diameter cylindrical section carries a panel arranged to close said fuselage side wall aperture when the sections are retracted into the fuselage.

6. A lift-augmenting device according to claim 1, wherein the slots are provided by throats built into the circumferential walls of the cylindrical sections which throats are constructed as rigid sub-assemblies each capable of transmitting the hoop tension across the break in the wall into which it is built.

7. A lift-augmenting device according to claim 1, wherein recirculating ball splines are provided to facilitate sliding of the sections of the lift-augmenting device.

8. An aircraft wherein there are two retractable lift-augmenting devices according to claim 1 arranged to project laterally when extended one on either side of the fuselage near the nose, the aircraft being a high speed aircraft having its main lifting surface aft.

9. In an aircraft having a fuselage, a lift-augmenting device including a substantially cylindrical structure which is extendable to a configuration in which it projects laterally from the aircraft fuselage with its axis across the direction of flight, said cylindrical structure comprising a first hollow cylindrical section fixedly mounted wholly within the aircraft fuselage in alignment with a fuselage side wall aperture, a plurality of further cylindrical sections of progressively decreasing diameter the largest of which is mounted to slide telescopically within said first cylindrical section while each of the remaining cylindrical sections is mounted to slide telescopically within the section next larger in diameter, said plurality of further cylindrical sections being extendable at will out through said aperture to project laterally from the fuselage and being retractable at will to bring all said cylindrical sections into a nested condition entirely within the fuselage, the cylindrical structure being supported from the fuselage at the larger diameter end only when extended, each of said cylindrical sections except said first section having a plurality of nozzles spaced equidistantly around its circumference and defining slot openings to deliver air out of the cylindrical section substantially tangentially, means for supplying air under pressure to the interior of said first section and thereby to the interiors of said further sections to both extend the cylindrical structure and provide a supply of air for discharge through the nozzles, power means to retract the sections of the cylindrical structure into the telescoped condition, sliding seals on said cylindrical sections to effect sealing between the cooperating ends of adjacent sections when the cylindrical structure is extended, and a closure panel carried by the outer end of the smallest diameter cylindrical section which panel is of a configuration to match the apertured portion of the fuselage wall and serves both to seal the outer end of the smallest diameter section against escape of air when the cylindrical structure is extended and to close the fuselage aperture when said structure is retracted into the fuselage.

10. In an aircraft, a lift-augmenting device according to claim 9 wherein the nozzles are in the form of throats that are constructed as rigid sub-assemblies built into gaps in the circumferential walls of the the cylindrical sections, each throat sub-assembly being capable of transmitting hoop tension in the section across the gap in the circumferential wall into which it is built.

11. An aircraft having two lift-augmenting devices according to claim 9, the cylindrical structures of said devices being arranged to project laterally when extended one on either side of the aircraft fuselage near the nose, the aricraft being a high speed aircraft having its main lifting surface aft.

References Cited in the file of this patent

UNITED STATES PATENTS

| | | |
|---|---|---|
| 2,503,009 | Thomson | Apr. 4, 1950 |
| 2,891,823 | Galonska | Jan. 23, 1959 |
| 2,929,582 | Munro | Mar. 22, 1960 |
| 2,941,752 | Gluhareff | June 21, 1960 |
| 3,025,026 | Nichols | Mar. 13, 1962 |

FOREIGN PATENTS

| | | |
|---|---|---|
| 921,308 | France | Jan. 10, 1947 |
| 1,137,715 | France | Jan. 14, 1957 |